United States Patent
Halalay et al.

(10) Patent No.: US 11,575,115 B2
(45) Date of Patent: Feb. 7, 2023

(54) METHOD AND APPARATUS FOR PYROLYZING AN ELECTRODE

(71) Applicant: GM GLOBAL TECHNOLOGY OPERATIONS LLC, Detroit, MI (US)

(72) Inventors: Ion C. Halalay, Grosse Pointe Park, MI (US); Kevin B. Rober, Washington, MI (US); Niccolo Jimenez, Royal Oak, MI (US); Michael P. Balogh, Novi, MI (US); Teresa U. Holiness-Stalling, Detroit, MI (US); Raghunathan K, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 732 days.

(21) Appl. No.: 16/511,438

(22) Filed: Jul. 15, 2019

(65) Prior Publication Data

US 2021/0020899 A1 Jan. 21, 2021

(51) Int. Cl.
| | |
|---|---|
| *H01M 4/04* | (2006.01) |
| *H01M 4/133* | (2010.01) |
| *H01M 4/1393* | (2010.01) |
| *C04B 35/622* | (2006.01) |
| *C04B 35/64* | (2006.01) |
| *C04B 35/626* | (2006.01) |

(52) U.S. Cl.
CPC ..... *H01M 4/0471* (2013.01); *C04B 35/62222* (2013.01); *C04B 35/62655* (2013.01); *C04B 35/64* (2013.01); *H01M 4/0404* (2013.01); *H01M 4/133* (2013.01); *H01M 4/1393* (2013.01); *C04B 2235/422* (2013.01); *C04B 2235/428* (2013.01); *C04B 2235/5248* (2013.01); *C04B 2235/606* (2013.01); *C04B 2235/656* (2013.01); *C04B 2235/658* (2013.01); *C04B 2235/661* (2013.01)

(58) Field of Classification Search
CPC .................................................. H01M 4/0471
See application file for complete search history.

(56) References Cited

U.S. PATENT DOCUMENTS

| | | | | |
|---|---|---|---|---|
| 2012/0264075 | A1* | 10/2012 | Wang | H01L 31/0322 432/77 |
| 2019/0081317 | A1* | 3/2019 | Keil | B05C 9/12 |
| 2020/0075902 | A1* | 3/2020 | Shimogawara | H01L 51/56 |
| 2020/0381699 | A1* | 12/2020 | Bonhomme | H01M 4/0435 |

* cited by examiner

*Primary Examiner* — Austin Murata
(74) *Attorney, Agent, or Firm* — Quinn IP Law

(57) ABSTRACT

An electrode heat treatment device and associated method for fabricating an electrode are described, and include forming a workpiece, including coating a current collector with a slurry. The workpiece is placed on a first spool, and the first spool including the workpiece is placed in a sealable chamber, wherein the sealable chamber includes the first spool, a heat exchange work space, and a second spool. An inert environment is created in the sealable chamber. The workpiece is subjected to a multi-step continuous heat treatment operation in the inert environment, wherein the multi-step continuous heat treatment operation includes continuously transferring the workpiece through the heat exchange work space between the first spool and the second spool and controlling the heat exchange work space to an elevated temperature.

17 Claims, 3 Drawing Sheets

METHOD AND APPARATUS FOR PYROLYZING AN ELECTRODE

INTRODUCTION

Lithium ion batteries include a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-ion batteries are growing in popularity for automotive, aerospace, and hand-held tool applications due to their high energy density and ability to undergo successive charge and discharge cycles.

SUMMARY

An electrode heat treatment device and associated method for fabricating an electrode are described, and include forming a workpiece, including coating a current collector with a slurry. The workpiece is placed on a first spool, and the first spool including the workpiece is placed in a sealable chamber, wherein the sealable chamber includes the first spool, a heat exchange work space, and a second spool. An inert environment is created in the sealable chamber. The workpiece is subjected to a multi-step continuous heat treatment operation in the inert environment, wherein the multi-step continuous heat treatment operation includes continuously transferring the workpiece through the heat exchange work space between the first spool and the second spool and controlling the heat exchange work space to an elevated temperature.

An aspect of the disclosure includes continuously transferring the workpiece through the heat exchange work space from the first spool to the second spool and controlling the heat exchange work space to a first elevated temperature for a first period of time, and then continuously transferring the workpiece through the heat exchange work space from the second spool to the first spool and controlling the heat exchange work space to a second elevated temperature for a second period of time, wherein the second temperature is greater than the first temperature.

Another aspect of the disclosure includes the first temperature and the first period of time being associated with a time-temperature relation to effect a chemical reaction in the workpiece.

Another aspect of the disclosure includes the time-temperature relation to effect the chemical reaction in the workpiece being a first temperature of between 180° C. and 400° C. for 60 minutes when the coating includes a polymeric binder fabricated from polyacrylonitrile or polyimide.

Another aspect of the disclosure includes the second temperature and the second period of time being associated with a time-temperature relation to effect carbonization of the workpiece.

Another aspect of the disclosure includes the time-temperature relation to effect carbonization of the workpiece being a second temperature between 450° C. and 750° C. for at least 60 minutes when the coating includes a polymeric binder.

Another aspect of the disclosure includes the workpiece being arranged as a sheet.

Another aspect of the disclosure includes dividing the workpiece into a plurality of electrode elements subsequent to subjecting the workpiece to the multi-step continuous heat treatment operation in the inert environment.

Another aspect of the disclosure includes subjecting the workpiece to a drying process prior to subjecting the workpiece to the multi-step continuous heat treatment operation in the inert environment.

Another aspect of the disclosure includes the drying process including a temperature environment between 80° C. and 150° C.

Another aspect of the disclosure includes creating the inert environment in the sealable chamber by initially evacuating the sealable chamber, and then flowing pressurized nitrogen gas into the sealable chamber while subjecting the workpiece to the multi-step continuous heat treatment operation in the inert environment.

Another aspect of the disclosure includes the slurry including silicon particles, a polymeric binder, and carbon fibers.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. As employed herein, the term "upstream" and related terms refer to elements that are towards an origination of a flow stream relative to an indicated location, and the term "downstream" and related terms refer to elements that are away from an origination of a flow stream relative to an indicated location.

Provided herein are methods and an associated apparatus for fabricating electrodes and battery cells including silicon-based host materials. The methods provide high capacity electrodes with high mechanical strength, minimal irreversible capacity loss during the first formation cycle, and improved capacity retention during prolonged cycling.

Figure 1:
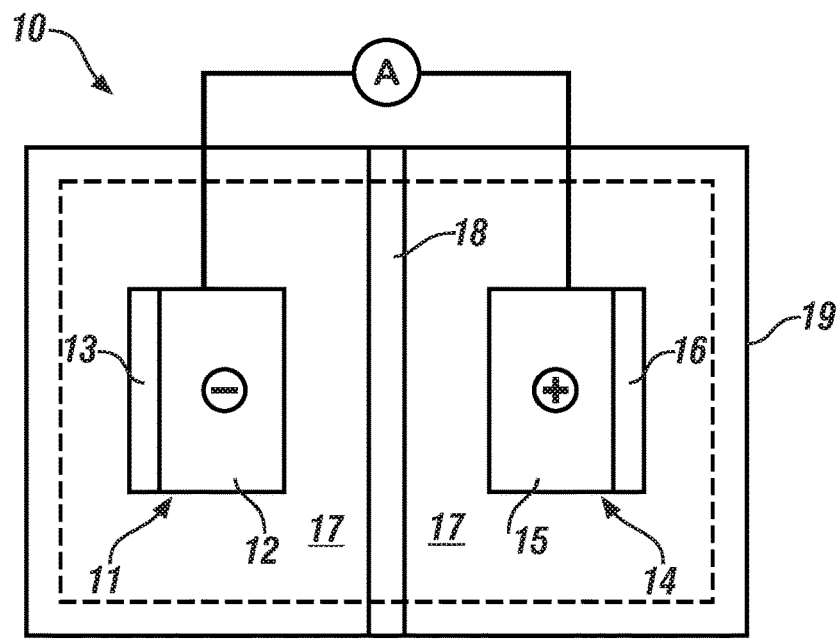
FIG. 1 schematically illustrates a lithium battery cell including an anode, a cathode, an electrolyte, and a separator, in accordance with the disclosure.

FIG. 1 illustrates a lithium-ion battery cell 10 including an anode 11, a cathode 14, an electrolyte 17 operatively disposed between the anode 11 and the cathode 14, and a separator 18. The battery cell 10 can be used in numerous applications, including as a DC power source for a hybrid-electric or electric vehicle. The anode 11, cathode 14, and electrolyte 17 can be encapsulated in container 19, which can be a hard (e.g., metallic) case or soft (e.g., polymer) pouch, for example. The anode 11 and cathode 14 are situated on opposite sides of the separator 18 which can include a microporous polymer or another material capable of conducting lithium ions and optionally electrolyte (i.e., liquid electrolyte). Electrolyte 17 is a liquid electrolyte including one or more lithium salts dissolved in a non-aqueous solvent. The anode 11 generally includes a current collector 12 and a host material 13 that can accept $Li^+$ ions applied thereto. Cathode 14 generally includes a current collector 15 and a mixed transitions metals-based active material 16 applied thereto. For example, the battery cell 10 can include a lithiated mixed transition metals oxide active material 16, as will be described below. Active material 16 can store lithium ions at a higher electric potential than the host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can include an exclusive interface between the anode 11 and cathode 14, respectively, and electrolyte 17.

The battery cell 10 generally operates by reversibly passing lithium ions between an anode 11 and cathode 14. $Li^+$ ions are released into the electrolyte solution at the cathode and accepted by the anode during cell charging. $Li^+$ ions are released into the electrolyte solution at the anode and accepted by the cathode during cell discharging. At the same time, electrons move through the external circuit (attached to the battery terminals) from the electrode that releases $Li^+$ ions towards the electrode that accepts $Li^+$ ions. At the beginning of a discharge, anode 11 contains a high concentration of intercalated/alloyed lithium ions while cathode 14 is relatively depleted, and establishing a closed external circuit between anode 11 and cathode 14 under such circumstances causes intercalated/alloyed lithium ions to be extracted from anode 11. The lithium ions are carried through the micropores of the separator 18 from anode 11 towards cathode 14 by the ionically conductive electrolyte 17 while, at the same time, the electrons are transmitted through the external circuit from anode 11 to cathode 14 to achieve overall electroneutrality. The flow of electrons through the external circuit can be harnessed and fed through a load device until the level of intercalated/alloyed lithium in the negative electrode falls below a workable level or the need for power ceases.

The battery cell 10 may be recharged after a partial or full discharge of its available capacity. To charge or re-energize the lithium ion battery cell, an external electric power source (not shown) is connected to the positive and the negative electrodes to drive the reverse of battery discharge electrochemical reactions. The external power source provides electrons to the anode of battery in such a way that the anode must accept $Li^+$ ions to satisfy electroneutrality. The lithium ions move through the electrolyte solution contained by the separator, and the electrons are driven back through the external circuit, both towards anode 11. The lithium ions and electrons are ultimately reunited at the negative electrode, thus replenishing it with intercalated/alloyed lithium for future battery cell discharge.

The battery cell 10, or a battery module or pack including a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between anode 11 and cathode 14, for example during charging or discharging the battery cell 10. The electrolyte 17 includes one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, $LiI$, $LiBr$, $LiSCN$, $LiBF_4$, $LiB(C_6H_5)_4$ $LiAsF_6$, $LiCF_3SO_3$, $LiN(CF_3SO_2)_2$, $LiN(FSO_2)_2$, $LiPF_6$, and mixtures thereof.

The separator 18 is a microporous polymer separator that can include, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume a copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. The separator 18 may also include other polymers in addition to the polyolefin such as, but not limited to, polyethylene terephthalate (PET), polyvinylidene fluoride (PVdF), and or a polyamide (Nylon). The separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium ion batteries, such as the battery cell 10. Skilled artisans will undoubtedly know and understand the many available polymers and commercial products from which the separator 18 may be fabricated, as well as the many manufacturing methods that may be employed to produce the separator 18.

Active material 16 can include a lithium-based active material that can sufficiently undergo lithium intercalation and deintercalation while functioning as the positive terminal of the battery cell 10. Active material 16 can also include a polymer binder material to structurally hold the lithium-based active material together. The active material 16 can include lithium transition metal oxides (e.g., layered lithium transitional metal oxides) or lithiated mixed transition metals oxide materials. Cathode current collector 15 can include aluminum or another appropriate electrically conductive material known to skilled artisans, and can be formed in a foil or grid shape. Electrically conductive materials can additionally be dispersed within the host material 13.

Lithium transition metal oxides useable as active material 16 can include one or more of spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3 \cdot (1-x)LiMO_2$, where M is composed of a ratio of Ni, Mn and/or Co). A specific example of the layered nickel-manganese oxide spinel is $xLi_2MnO_3(1-x)Li(Ni_{1/3}Mn_{1/3}Co_{1/3})O_2$. Other lithium-based active materials include $Li(Ni_{1/3}Mn_{1/3}Co_{1/3})O_2$), $LiNiO_2$, $Li_{x+y}Mn_{2-y}O_4$ (LMO, 0<x<1 and 0<y<0.1), or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of a ratio of Al, Co, and/or Mg), $LiNi_{1-x}Co_{1-y}Mn_{x+y}O_2$ or $LiMn_{1.5-x}Ni_{0.5-y}M_{x+y}O_4$ (M is composed of a ratio of Al, Ti, Cr, and/or Mg), stabilized lithium manganese oxide spinel ($Li_xMn_{2-y}M_yO_4$, where M is composed of a ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of a ratio of Co, Fe, and/or Mn), and another high efficiency nickel-manganese-cobalt material (HE-NMC, NMC or $LiNiMnCoO_2$). So, for example, M could be Al, with or without Co and/or Mg, or another combination of the listed elements. In another example, anion substitutions may be made in the lattice of an example of the lithium transition metal based active material to stabilize the crystal structure. For example, an O atom may be substituted with an F atom.

Binders may include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or another binder material known to skilled artisans. Other binders include polyvinyl alcohol (PVA), sodium alginate, or other water-soluble binders. The polymer binder structurally holds the lithiated mixed transition metals oxide active material and the conductive filler together. An example of the conductive filler is a high surface area carbon, such as acetylene black or activated carbon. The conductive filler ensures electron conduction between the positive-side current collector 26 and the lithiated mixed transition metals oxide active material. In an example, the positive electrode active material may be encapsulated with carbon.

The anode current collector 12 can include copper, nickel, copper-nickel alloys, or another appropriate electrically conductive material known to skilled artisans. Also, the anode current collector 12 may be treated (e.g., coated) with electrically conductive materials, including chromium and pyrolyzed polymers. The current collector surfaces can be roughened, and/or the current collector can be perforated, for example. Silicon has the highest known theoretical charge capacity for lithium, making it one of the most promising anode host materials 13 for rechargeable lithium-ion batteries. Accordingly, provided herein are electrodes including silicon-based host materials (13), and methods for fabricating the same.

Figure 2:
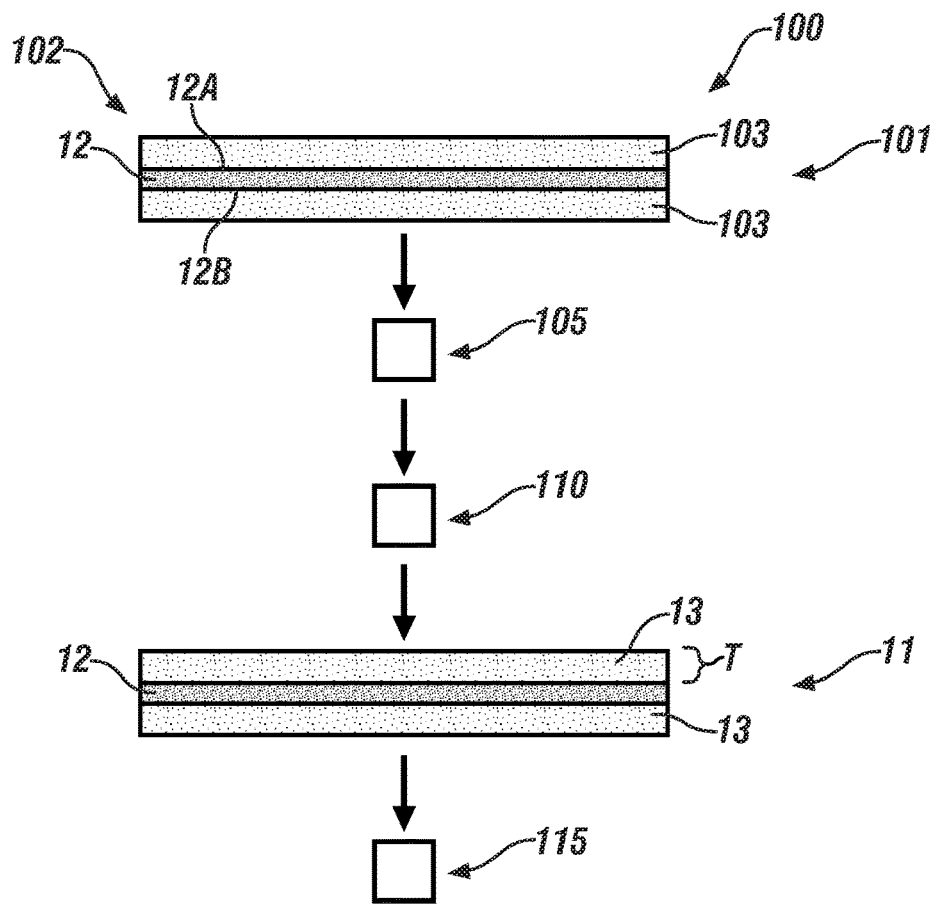
FIG. 2 schematically illustrates a method for fabricating an electrode and battery cell, in accordance with the disclosure.

FIG. 2 illustrates a method for fabricating an electrode (e.g., anode 11) and battery cells (e.g., battery cell 10) utilizing the same. Method 100 includes coating 101 a current collector 12 with a slurry 103 to form a coated current collector 102, subjecting the coated current collector 102 to a heat treatment step 110 to produce the electrode (anode 11) including at least one layer of silicon-based host material 13. As shown in FIG. 2, current collector 12 has one or more faces (e.g., a first current collector face 12A and a second current collector face 12B) to which the slurry 103 can be applied. Method 100 can further include, after coating 101 and prior to the heat treatment step 110, a drying step 105 for treating the coated current collector 102. Method 100 can further include subsequently assembling 115 the battery cell (e.g., battery cell 10) by disposing the electrode (e.g., anode 11) and a positive electrode (e.g., cathode 14) in an electrolyte (e.g., electrolyte 17). Assembling 115 the battery cell can also include disposing a separator (e.g., separator 18) between the electrode (e.g., anode 11) and the positive electrode (e.g., cathode 14).

The slurry 103 includes a dry fraction and one or more solvents. The dry fraction includes silicon particles, one or more polymeric binders, and carbon fibers. The amount of solvent utilized in the slurry is tailored to achieve a particular slurry viscosity and/or another physical characteristic for the application of the slurry 103 to the current collector. For example, the slurry can include about 25 wt. % to about 30 wt. % dry fraction and about 70 wt. % to about 75 wt. % solvent(s), in one embodiment. The solvent(s) can include polar solvents, including N-Methyl-2-pyrrolidone (NMP), dimethyl formamide, dimethyl sulfoxide, propylene carbonate, ethylene carbonate, acetone, and methyl ethyl ketone, among others.

The silicon particles can include elemental silicon particles, period table Group V (e.g., P, As, Sb, Bi) n-type doped silicon particles, and/or $Li_2Si$ particles. Silicon particles can additionally or alternatively include $SiO_x$, wherein generally $x \leq 2$. In some embodiments, for some $SiO_x$ particles, $x \approx 1$. For example, x can be about 0.9 to about 1.1, or about 0.99 to about 1.01. Within a body of $SiO_x$ particles, $SiO_2$ and/or Si domains may further exist. In some embodiments, the silicon particles can be considered "single phase" and not include added conductive carbon (e.g., graphite). In other words, in such embodiments, the carbon present in the host material 13 can consist essentially of carbon contributed by the carbon fibers, the carbon nanotubes, carbon present in the current collector, and carbon contributed by the pyrolyzed polymeric binders.

Utilizing Li$_2$Si particles can help prevent volumetric expansion of silicon particles, and irreversible capture of lithium from the cathode 14 during initial cycling of the battery cell 10. The silicon particles can have an average particle diameter of less than about 10 µm, about 50 nm to about 10 µm, or about 3 µm to about 10 µm in some embodiments. In some embodiments, particularly battery cells 10 configured for fast charging, the silicon particles can have an average particle diameter of about 1 µm to about 3 µm, or about 0.5 µm to about 1 µm. The dry fraction can include at least about 70 wt. % silicon particles. In some embodiments, the dry fraction can include about 70 wt. % to about 95% silicon particles. In some embodiments, the dry fraction can include about 75 wt. % to about 85% silicon particles. In embodiments utilizing Li$_2$Si particles, the amount of lithium atoms approximate the amount of silicon atoms in the dry fraction. For example, the silicon particles can include about 45% to about 50% (by count) of the total of silicon and lithium atoms.

The one or more polymeric binders can include polyacrylonitrile (PAN), and/or one or more fluorinated polymers (e.g., polyvinylidiene fluoride (PVDF), polytetrafluoroethylene (PTFE), fluorinated ethylene propylene (FEP), and perfluoroalkoxy alkanes (PFA)). In one embodiment the polymeric binder is PAN. The polymeric binder can include up to about 10 wt. % or about 5 wt. % to about 10 wt. % of the dry fraction. As will be described below, the amount of polymeric binder in the dry fraction can be tuned to achieve desirable caging of silicon particles by pyrolyzed polymeric binder.

The carbon fibers can have an average diameter of at least about 50 nm, about 50 nm to about 200 nm, or about 100 nm to about 200 nm. The carbon fibers can have an average length of at least about 1 µm, or about 1 µm to about 20 µm. The carbon fibers provide stiffness and mechanical integrity to the host material 13 while being electrically conductive. The dry fraction can optionally further include carbon nanotubes. Carbon nanotubes can have an average diameter of about 20 nm to about 50 nm and an average length of about 1 µm to about 2 µm, for example. Carbon nanotubes are very flexible and provide minimal strength relative to carbon fibers but increase electrical connections between individual silicon particles and between silicon particles and the current collector 12. In some embodiments, the weight ratio of carbon fibers to carbon nanotubes can be about 50:1 to about 4:1. The carbon fibers (and optionally the carbon nanotubes, collectively with the carbon fibers) can include up to about 15 wt. %, or about 2 wt. % to about 15 wt. % of the dry fraction. The upper limit of the amount of carbon fibers (and optionally the carbon nanotubes, collectively with the carbon fibers) can be defined by the amount of polymeric binder to maintain the structural integrity of the resulting host material 13.

Subsequent to coating 101 and prior to the heat treatment step 110, the coated current collector 102 can be subjected to the drying step 105. The drying step 105 is executed to remove the solvent(s) from the slurry, generally by evaporation. The drying step 105 can occur at temperatures below about 100° C. and can occur in an open air (i.e., non-inert) environment. The heat treatment step 110 is intended to occur in an environment that is free of oxygenated gases (e.g., O$_2$, CO, CO$_2$, etc.), or an "inert atmosphere". An inert atmosphere can include an N$_2$, Ar, and/or He atmosphere, for example.

The heat treatment step 110 can include heating at a first temperature in an inert environment for a first period of time, following by heating at a second temperature in an inert environment for a second period of time, wherein the second temperature is greater than the first temperature.

Figure 3:
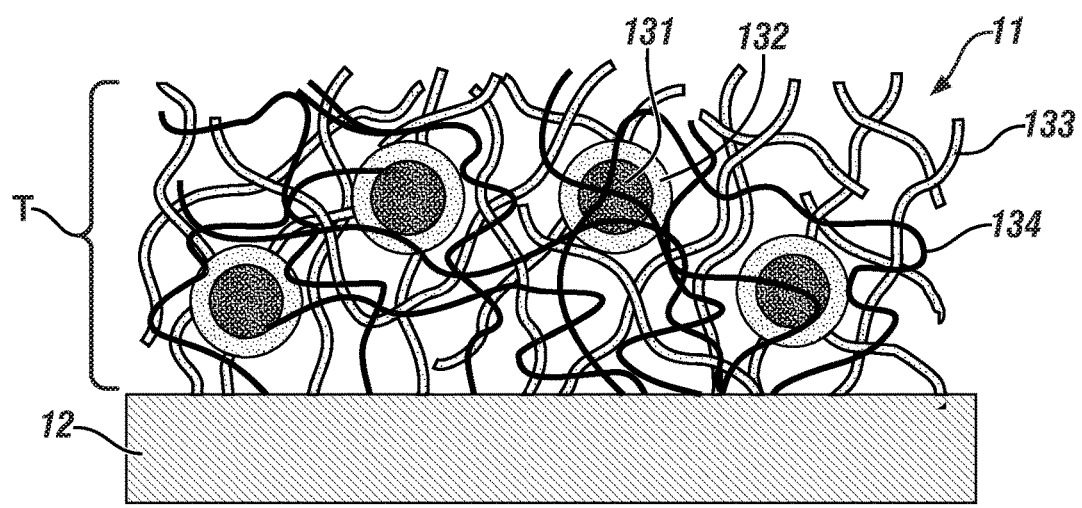
FIG. 3 pictorially illustrates a cross-sectional side view of a pyrolyzed anode, in accordance with the disclosure.

FIG. 3 illustrates a schematic cross-sectional side view of an electrode (i.e., anode 11) that has been subjected to the heat treatment step 110. The heat treatment step carbonizes the polymeric binder(s) to create a carbon layer 132 around the silicon particles 131 to buffer silicon particle 131 expansion and further anchor the carbon fibers 133 to the silicon particles 131, the current collector 12, and optionally the carbon nanotubes 134. The heat treatment step 110 at a first temperature followed by the heat treatment step 110 at a second temperature is intended to convert the polymeric binder(s) to a desired material with desired mechanical and/or electrical properties. For example, the polymeric binder PAN can be converted to pyridine rings at the first temperature, and the pyridine rings, and other remaining polymeric compounds, can be dehydrogenated at the second temperature. After dehydrogenation there is no more polymer, all that remains is the carbon backbone, perhaps with inclusions of nitrogen and/or oxygen atoms, which in turn may be removed.

Excessive heat treatment temperatures can create a brittle host material 13 which is not mechanically robust. Accordingly, the first temperature can be up to about 400° C., or about 250° C. to about 400° C., and the second temperature can be less than about 750° C. and higher than the first temperature, about 450° C. to about 750° C., about 500° C. to about 750° C., or about 700° C. to about 750° C. The heat treatment step 110 at the first temperature to effect polymer curing, crosslinking or cyclization can occur for about 1 hour, or about 0.25 hours to about 2 hours in an inert environment. The heat treatment step 110 at the second temperature can occur for about 1 hour, or about 0.25 hours to about 2 hours in the inert environment. The duration of the heat treatment step 110 can be tuned to the thickness T of the host material layer 13, wherein a thinner host material 13 layer generally requires a shorter duration of the heat treatment step 110. In some embodiments, the thickness T of the silicon-based host material 13 layer is about 20 µm to about 50 µm, or up to about 50 µm.

Figure 4:
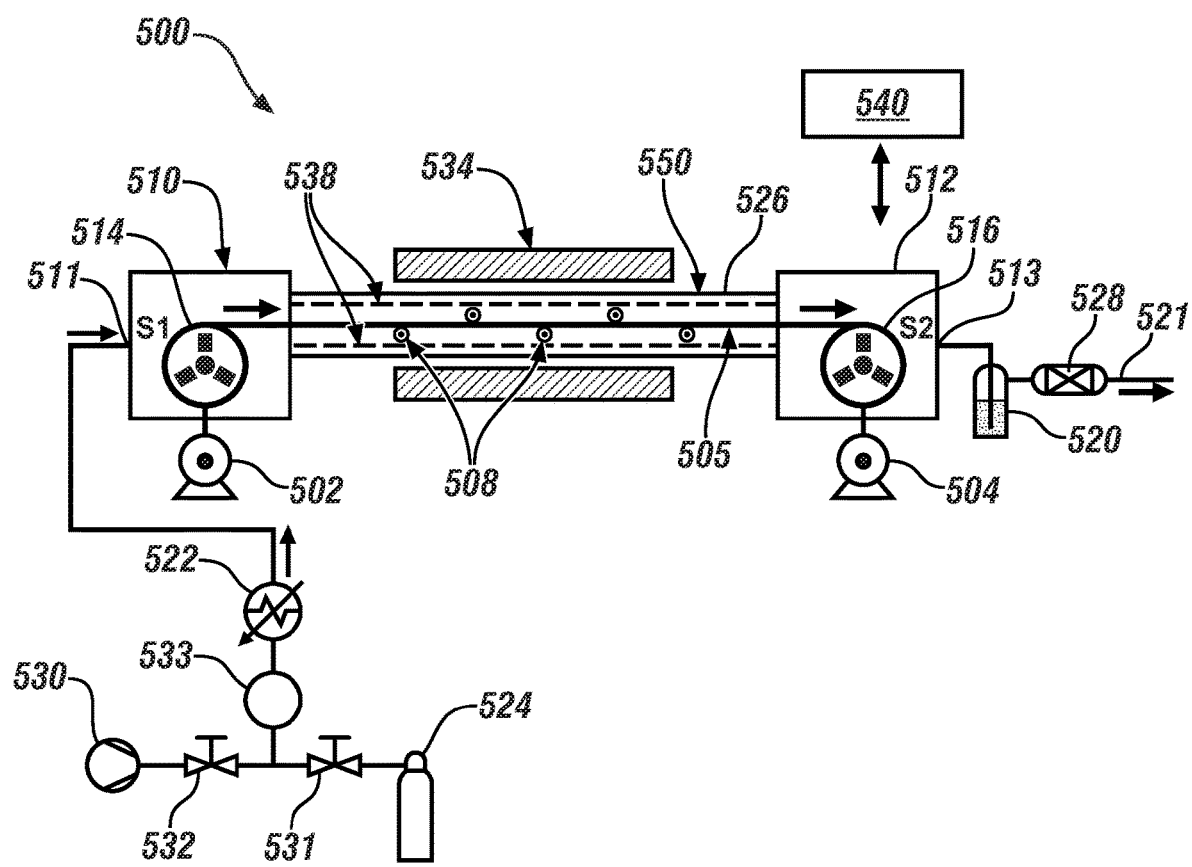
FIG. 4 schematically illustrates a first embodiment of an apparatus in the form of an electrode heat treatment device for performing heat treatment on a workpiece in a continuous manner, in accordance with the disclosure.

FIG. 4 schematically shows a first embodiment of an electrode heat treatment apparatus 500 in the form of an electrode heat treatment device for performing heat treatment on a workpiece 505 in a continuous manner. The workpiece 505 is in the form of an embodiment of the coated current collector 102 that has been arranged as a sheet, and may be in the form of the anode current collector 12 that has been coated with the slurry 103 and in an uncured state, as described with reference to FIG. 2. The electrode heat treatment device 500 may also be employed to perform heat treatment of an embodiment of the positive electrode (i.e., the cathode) 14. By way of example, the electrode heat treatment device 500 provides for spool-to-spool processing of the workpiece 505 that is in the form of a composite Li-ion battery electrode that incorporates silicon or other active materials for electrodes and is devoid of polymeric binders, through heat treatment at temperatures exceeding 400° C.

The electrode heat treatment device 500 is arranged to provide a sealable, i.e., airtight chamber 550 that can be controlled to provide an inert environment for executing the heat treatment step 110 on the workpiece 505 in a continuous operation, wherein the heat treatment process may be performed at two or more temperature levels, as described herein. The heat treatment step 110 can include a multi-step continuous heat treatment operation in an inert environment, which includes heating at a first temperature in the inert environment, and subsequently heating at a second temperature in the inert environment, wherein the second temperature is higher than the first temperature. In this embodiment of the electrode heat treatment apparatus 500, heat treatment is performed sequentially, by running the electrode precursor sheet through the same apparatus consecutively in two opposite directions, with the first iteration including operating at a lower temperature $T_1$, and the second iteration including operating at a higher temperature $T_2$.

The workpiece 505 includes the coated current collector 102 arranged in a sheet and spooled onto a first spool. The electrode heat treatment device 500 includes a first spool 514 disposed in a first spool housing 510, a second spool 516 disposed in a second spool housing 512, a plurality of ceramic rollers 508 and guide rails 538 disposed in a heat exchange work space 526, and a tube furnace 534. The heat exchange work space 526 may be in the form of a quartz tube in one embodiment, and the tube furnace 534 may be arranged to encompass all or a portion of the quartz tube to effect heat transfer thereto. In one embodiment, the tube furnace 534 is a radiant heating device.

The first spool housing 510, the second spool housing 512 and the heat exchange work space 526 form the sealable chamber 550 when assembled. Related components include a first electric motor 502, a second electric motor 504, a vacuum pump 532, a nitrogen gas tank 524, first and second valves 531, 532, respectively, a gas heater 522, a flow controller 533, a gas bubbler 520, a gas scrubber 528 and an atmospheric outlet 521. A controller 540 is arranged to monitor and control temperature of the tube furnace 534 and control operation of the first and second electric motors 502, 504 to control speeds of the first and second spools 514, 516 in order to expose the workpiece 505 to the desired temperatures for the desired periods of time, as described herein.

The first spool housing 510, the second spool housing 512, and the heat exchange work space 526 are arranged and assembled such that the plurality of ceramic rollers 508 and guide rails 538 disposed in the heat exchange work space 526, and the first and second spools 514, 516 are disposed in the sealable chamber 550 formed thereby, and thus able to provide an inert, oxygen-free environment for the workpiece 505 when executing the heat treatment step 110 on the workpiece 505 in continuous operation. The tube furnace 534 is arranged to encompass all or a substantial portion of the heat exchange work space 526 along its longitudinal axis. The tube furnace 534 is configured to transfer heat to the heat exchange work space 526 and hence to a portion of the workpiece 505 that is disposed in the heat exchange work space 526.

The first electric motor 502 is arranged to control rotation of the first spool 514, and the second electric motor 504 is arranged to control rotation of the second spool 516. The first and second electric motors 502, 504 are positioned outside of the respective first and second spool housings 510, 512, and thus are not exposed to the inert environment during heat treatment.

The vacuum pump 532, nitrogen gas tank 536, first and second valves 531, 532, gas heater 522, and flow controller 533 are fluidly coupled and arranged to control fluidic flow to a first inlet 511 disposed in the first spool housing 510. The gas bubbler 520 and gas scrubber 528 are fluidly arranged between a second inlet 513 that is disposed in the second spool housing 512 and an atmospheric outlet 521.

Material processing includes loading the workpiece 505 into the electrode heat treatment device 500 and performing associated setup to form the sealable chamber 550, and subjecting the workpiece 505 to a multi-step continuous heat treatment operation in an inert environment that is created in the sealable chamber 550. The processing further includes teardown to prepare for a subsequent operation.

Prior to the processing step, the workpiece 505 is arranged as a continuous sheet that includes the current collector 12 with the slurry 103 coated thereon in an uncured state. The workpiece 505 is arranged on the first spool 514.

Loading the workpiece 505 into the electrode heat treatment device 500 includes mounting the first spool 514 including the workpiece 505 into the first spool housing 510, and threading a free end of the workpiece 505 through along the guide rails 538. The heat exchange work space 526 is slipped over the guide rails 538 and connected to the first spool housing 510. The free end of the workpiece 505 is connected to the second spool 516, which is empty and is contained in the second spool housing 512, and the second spool housing 512 is connected to a second, free end of the heat exchange work space 526, with the tube furnace 534 disposed on an outside of the heat exchange work space 526. All connections are checked to verify that they are air-tight. The vacuum pump 532 is operated to evacuate the electrode heat treatment device 500 to a low vacuum. The first and second valves 530, 531 and the nitrogen gas tank 536 are controlled to fill the electrode heat treatment device 500 with nitrogen gas, and the nitrogen gas tank 536 continues to provide flow of nitrogen subsequently to maintain the environment within the electrode heat treatment device 500 in an oxygen-free state. At this point, the electrode heat treatment device 500 is in condition to perform the multi-step continuous heat treatment operation.

A first portion of the multi-step continuous heat treatment operation includes operating the tube furnace 534 to achieve the first temperature within the heat exchange work space 526 to effect a curing or another chemical reaction operation on the workpiece 505. By way of a non-limiting example, the first temperature may be in the order of magnitude of 250-275° C. when the polymeric binder of the coating is PAN.

The first and second electric motors 502, 504 are controlled to rotate and thus transfer the workpiece 505 from the first spool 514 to the second spool 516 at a speed that is chosen to achieve a desired residence time for the workpiece 505 in the tube furnace 534 at the first temperature. By way of example, the desired residence time is 1 hour to effect the curing or chemical reaction in the workpiece 505 when the polymeric binder of the coating is PAN.

At the end of the curing operation on the workpiece 505, the first and second gas inlets 511, 513 are switched so the vacuum pump 532, nitrogen gas tank 536, first and second valves 531, 532, gas heater 522, and flow controller 533 are fluidly coupled and arranged to control fluidic flow to the second inlet 513 disposed in the second spool housing 512, and the gas bubbler 520 and gas scrubber 528 are fluidly arranged between the first inlet 511 that is disposed in the first spool housing 510 and the atmospheric outlet 521. This is done to reverse the gas flow direction in the heat exchange work space 526 from the second spool housing 512 to the first spool housing 510.

The second portion of the multi-step continuous heat treatment operation includes operating the tube furnace 534 to achieve a second temperature within the heat exchange work space 526 to effect a carbonization operation on the workpiece 505. By way of a non-limiting example, the second temperature may be in a range between 500° C. and 700° C. when the polymeric binder of the coating is PAN.

The first and second electric motors 502, 504 are controlled to rotate and thus transfer the workpiece 505 from the second spool 516 to the first spool 514 at a speed that is chosen to achieve a desired residence time for the workpiece 505 in the tube furnace 534 at the second temperature. By way of example, the desired residence time is 1 hour to effect the heat treatment operation on the workpiece 505 when the polymeric binder of the coating is PAN.

At the end of the heat treatment operation on the workpiece 505, the gas heater 522 is deactivated with nitrogen gas flowing until the first spool 514 and the workpiece 505 cool to room temperature. The first spool 514 can be removed, and the workpiece 505 can be subjected to post-processing operations such as cutting and trimming to form the anode 11, which can then be assembled into the battery cell 10.

At completion of the multi-step continuous heat treatment operation, the electrode heat treatment device 500 is able to be torn down to prepare for a subsequent operation, which includes disconnecting the second spool housing 512 from the heat exchange work space 526 and guide rails 538, and remove the heat exchange work space 526 from the guide rails 538 and from the first spool housing 510.

Figure 5:
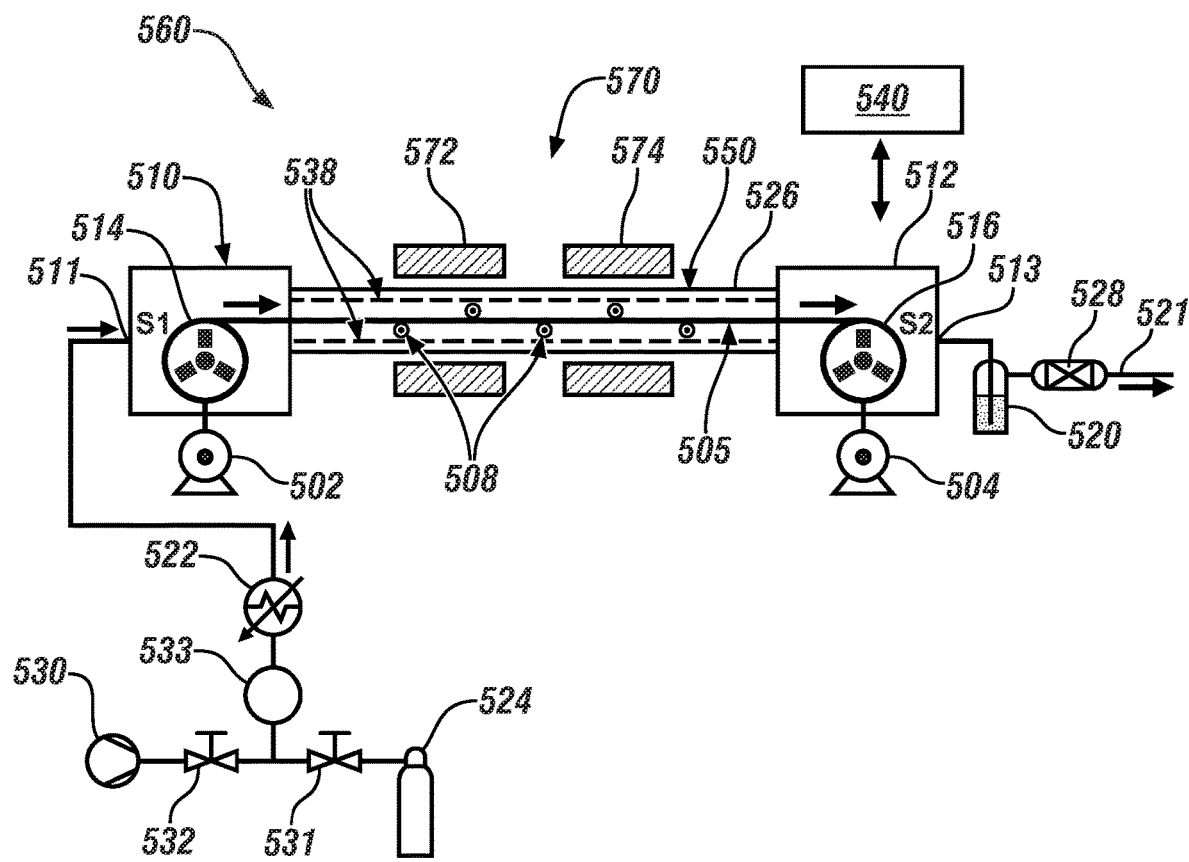
FIG. 5 schematically illustrates a second embodiment of an apparatus in the form of an electrode heat treatment device for performing heat treatment on a workpiece in a continuous manner, in accordance with the disclosure.

FIG. 5 schematically shows another embodiment of a heat treatment apparatus 560 in the form of an electrode heat treatment device for performing heat treatment on the workpiece 505 in a continuous manner. The electrode heat treatment device 560 provides for spool-to-spool processing of the workpiece 505 that is in the form of a composite Li-ion battery electrode that incorporates silicon or other active materials for electrodes and is devoid of polymeric binders, through heat treatment at temperatures exceeding 400° C. In this embodiment of the heat treatment apparatus 560, heat treatment is performed in a continuous fashion, by running the electrode precursor sheet through two heat treatment zones that may be generated by a two-stage tube furnace 570, including a first portion 572 of the tube furnace 570 operating at the first, lower temperature $T_1$, and a second portion 574 of the tube furnace 570 operating at the second higher temperature $T_2$. The first and second portions 572, 574 of the tube furnace 570 effectively divides the heat exchange work space 526 into two temperature zones, corresponding to the first and second temperatures $T_1$ and $T_2$.

The heat treatment apparatus 560 is arranged to provide a sealable, i.e., airtight chamber 550 that can be controlled to provide an inert environment for executing the heat treatment step 110 on the workpiece 505 in a continuous operation, wherein the heat treatment process may be performed at two or more temperature levels. The heat treatment step 110 can include a continuous heat treatment operation in an inert environment, which includes heating at a first temperature in the inert environment at the first portion 572 of the tube furnace 570, and subsequently heating at a second temperature in the inert environment at the second portion 574 of the tube furnace 570, wherein the second temperature is higher than the first temperature. Such heat treatment can be performed continuously and in series by running the electrode precursor sheet through two heat treatment zones, the first one at the lower temperature $T_1$, the second one at the higher temperature $T_2$. Other aspects of the heat treatment apparatus 560 are analogous to the heat treatment apparatus 500 that is described with reference to FIG. 4.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium are able to produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for fabricating an electrode, comprising:
    forming a workpiece, including coating a current collector with a slurry;
    placing the workpiece on a first spool;
    placing the first spool including the workpiece in a sealable chamber, wherein the sealable chamber includes the first spool, a heat exchange work space, and a second spool;
    creating an inert environment in the sealable chamber; and
    subjecting the workpiece to a multi-step continuous heat treatment operation in the inert environment;
    wherein the multi-step continuous heat treatment operation includes continuously transferring the workpiece through the heat exchange work space between the first spool and the second spool and controlling the heat exchange work space to an elevated temperature;
    wherein continuously transferring the workpiece through the heat exchange work space between the first spool and the second spool and controlling the heat exchange work space to an elevated temperature comprises:
        continuously transferring the workpiece through the heat exchange work space from the first spool to the second spool and controlling the heat exchange work space to a first elevated temperature for a first period of time; and then
        continuously transferring the workpiece through the heat exchange work space from the second spool to the first spool and controlling the heat exchange work space to a second elevated temperature for a second period of time;
wherein the second elevated temperature is greater than the first elevated temperature.

2. The method of claim 1, wherein the slurry includes silicon particles, a polymeric binder, and carbon fibers.

3. The method of claim 1, wherein the first elevated temperature and the first period of time are associated with a time-temperature relation to effect a chemical reaction in the workpiece.

4. The method of claim 3, wherein the time-temperature relation to effect the chemical reaction in the workpiece comprises a first temperature range between 180° C. and 400° C. for a period of time between 15 to 180 minutes when the coating includes a polymeric binder fabricated from polyacrylonitrile.

5. The method of claim 1, wherein the second elevated temperature and the second period of time are associated with a time-temperature relation to effect carbonization of the workpiece.

6. The method of claim 1, wherein the time-temperature relation to effect carbonization of the workpiece comprises a second temperature range from 450° C. to 750° C. for at least 30 minutes when the coating includes a polymeric binder fabricated from polyacrylonitrile.

7. The method of claim 1, wherein the first elevated temperature and the first period of time are associated with a time-temperature relation to effect a chemical reaction in of the workpiece, and wherein the second elevated temperature and the second period of time are associated with a time-temperature relation to effect carbonization of the workpiece.

8. The method of claim 1, wherein the workpiece is arranged as a sheet.

9. The method of claim 1, further comprising dividing the workpiece into a plurality of electrode elements subsequent to subjecting the workpiece to the multi-step continuous heat treatment operation in the inert environment.

10. The method of claim 1, further comprising subjecting the workpiece to a drying process prior to subjecting the workpiece to the multi-step continuous heat treatment operation in the inert environment.

11. The method of claim 10, wherein the drying process includes subjecting the workpiece to a temperature environment in a range between 60° C. and 150° C.

12. The method of claim 1, wherein creating the inert environment in the sealable chamber comprises initially evacuating the sealable chamber, and then flowing pressurized nitrogen gas into the sealable chamber while subjecting the workpiece to the multi-step continuous heat treatment operation in the inert environment.

13. An electrode heat treatment device, comprising:
first and second spool housings;
a heat exchange work space interposed between the first and second spool housings, wherein the heat exchange work space and the first and second first spool housings form a sealable chamber;
a furnace arranged to encompass the heat exchange work space to transfer heat thereto; and a controller, the controller being operatively connected to the first and second spool housings and the furnace;
the first spool housing being fluidly coupled to a vacuum pump and a container containing pressurized inert gas; and
the second spool housing being fluidly coupled to an atmospheric outlet;
wherein the first spool housing includes a first spool;
wherein the second spool housing includes a second spool; and
wherein the controller has an executable program that when executed performs a multi-step continuous heat treatment operation to act on a workpiece formed by coating a current collector with a slurry in an inert environment, the multi-step continuous heat treatment operation including:
placing the workpiece on the first spool;
placing the first spool including the workpiece in the sealable chamber, wherein the sealable chamber includes the first spool, the heat exchange work space, and the second spool;
creating an inert environment in the sealable chamber; and
continuously transferring the workpiece through the heat exchange work space between the first spool and the second spool and controlling the heat exchange work space to an elevated temperature;
wherein continuously transferring the workpiece through the heat exchange work space between the first spool and the second spool and controlling the heat exchange work space to an elevated temperature comprises:
continuously transferring the workpiece through the heat exchange work space from the first spool to the second spool and controlling the heat exchange work space to a first elevated temperature for a first period of time; and then
continuously transferring the workpiece through the heat exchange work space from the second spool to the first spool and controlling the heat exchange work space to a second elevated temperature for a second period of time;
wherein the second elevated temperature is greater than the first elevated temperature.

14. The electrode heat treatment device of claim 13, wherein continuously transferring the workpiece through the heat exchange work space between the first spool and the second spool and controlling the heat exchange work space to an elevated temperature comprises:
continuously transferring the workpiece through the heat exchange work space from the first spool to the second spool and controlling the heat exchange work space to a first elevated temperature for a first period of time; and then
continuously transferring the workpiece through the heat exchange work space from the second spool to the first spool and controlling the heat exchange work space to a second elevated temperature for a second period of time;
wherein the second elevated temperature is greater than the first elevated temperature.

15. The electrode heat treatment device of claim 13, wherein the furnace arranged to encompass the heat exchange work space to transfer heat thereto comprises a first portion operating at the first elevated temperature, and a second portion operating at the second elevated temperature, and
wherein continuously transferring the workpiece through the heat exchange work space between the first spool and the second spool and controlling the heat exchange work space to the elevated temperature comprises:
continuously transferring the workpiece through the heat exchange work space from the first spool to the second spool;

controlling the first portion of the furnace to the first elevated temperature for a first period of time; and controlling the second portion of the furnace to the second elevated temperature for a second period of time;

wherein the second elevated temperature is greater than the first elevated temperature.

16. The electrode heat treatment device of claim 15, wherein the first elevated temperature and the first period of time are associated with a time-temperature relation to effect a chemical reaction in of the workpiece, and wherein the second elevated temperature and the second period of time are associated with a time-temperature relation to effect carbonization of the workpiece.

17. The electrode heat treatment device of claim 13, wherein creating the inert environment in the sealable chamber comprises initially evacuating the sealable chamber, and then flowing pressurized nitrogen gas into the sealable chamber while subjecting the workpiece to the multi-step continuous heat treatment operation in the inert environment.

* * * * *